United States Patent
Jang et al.

(10) Patent No.: US 10,662,569 B2
(45) Date of Patent: May 26, 2020

(54) DRIVING APPARATUS FOR WASHING MACHINE

(71) Applicant: NEW MOTECH CO., LTD., Gwangju (KR)

(72) Inventors: Jeong Cheol Jang, Gwangju (KR); Ji Min Lee, Gwangju (KR); Gyeong Sik Yang, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 542 days.

(21) Appl. No.: 15/238,735

(22) Filed: Aug. 17, 2016

(65) Prior Publication Data

US 2017/0096763 A1    Apr. 6, 2017

(30) Foreign Application Priority Data

Oct. 6, 2015  (KR) .......................... 10-2015-0140306

(51) Int. Cl.
*D06F 37/30* (2020.01)
*H02K 7/10* (2006.01)
(Continued)

(52) U.S. Cl.
CPC .............. *D06F 37/30* (2013.01); *D06F 37/40* (2013.01); *H02K 5/10* (2013.01); *H02K 5/24* (2013.01); *H02K 7/10* (2013.01); *H02K 7/108* (2013.01)

(58) Field of Classification Search
CPC ........... D06F 37/30; D06F 37/40; H02K 5/10; H02K 5/24; H02K 7/10; H02K 7/108
(Continued)

(56) References Cited

U.S. PATENT DOCUMENTS

| 6,148,646 A * | 11/2000 | Koshiga | ................ D06F 37/304 68/23.7 |
| 2005/0166643 A1* | 8/2005 | Cho | ...................... D06F 37/304 68/12.02 |

(Continued)

FOREIGN PATENT DOCUMENTS

| JP | 2014068854 A * | 4/2014 |
| KR | 10-1033566 B1 | 5/2011 |

(Continued)

OTHER PUBLICATIONS

Kim (KR 20110087152 A) English Translation (Year: 2011).*
Ariga (JP 2014068854 A) English Translation (Year: 2014).*

*Primary Examiner* — Quyen P Leung
*Assistant Examiner* — Robert E Mates
(74) *Attorney, Agent, or Firm* — Revolution IP, PLLC

(57) ABSTRACT

Disclosed is a driving apparatus for a washing machine, which includes a washing shaft and a dewatering shaft which penetrate into the inside; an annular clutch holder installed at the bottom of the clutch housing; a clutch lever hinge-coupled to the clutch holder, the clutch lever consisting of a top rotating unit and a coupler receiving unit; a driving lever having a lever arm connected to the top rotating unit of the clutch lever by a linking spring to operate; a clutch coupler laid on the top of the coupler receiving unit to make up and down spline movement by the coupler receiving unit; and a motor assembly comprising a stator assembly coupled to the bottom of the clutch holder and comprising a stator core, and a rotor assembly comprising a rotor housing.

2 Claims, 5 Drawing Sheets

(51) Int. Cl.
*D06F 37/40* (2006.01)
*H02K 5/10* (2006.01)
*H02K 5/24* (2006.01)
*H02K 7/108* (2006.01)

(58) Field of Classification Search
USPC ............ 310/78, 92, 100, 76, 84, 102 A, 103
See application file for complete search history.

(56) References Cited

U.S. PATENT DOCUMENTS

| | | | |
|---|---|---|---|
| 2010/0175437 A1* | 7/2010 | Kim .................... | D06F 23/04 68/23 R |
| 2011/0081231 A1* | 4/2011 | Hoelzer ................ | F04D 19/042 415/119 |
| 2013/0036773 A1* | 2/2013 | Choi .................... | D06F 37/40 68/140 |

FOREIGN PATENT DOCUMENTS

| | | | | |
|---|---|---|---|---|
| KR | 20110087152 A | * | 8/2011 | |
| KR | 10-1363227 B1 | | 2/2014 | |
| KR | 10-2014-0130353 A | | 11/2014 | |
| KR | 10-1524919 B1 | | 6/2015 | |
| WO | WO-2014042340 A1 | * | 3/2014 | ............... H02K 5/10 |
| WO | WO-2014178531 A1 | * | 11/2014 | ............. D06F 37/30 |

\* cited by examiner

【Fig. 1】
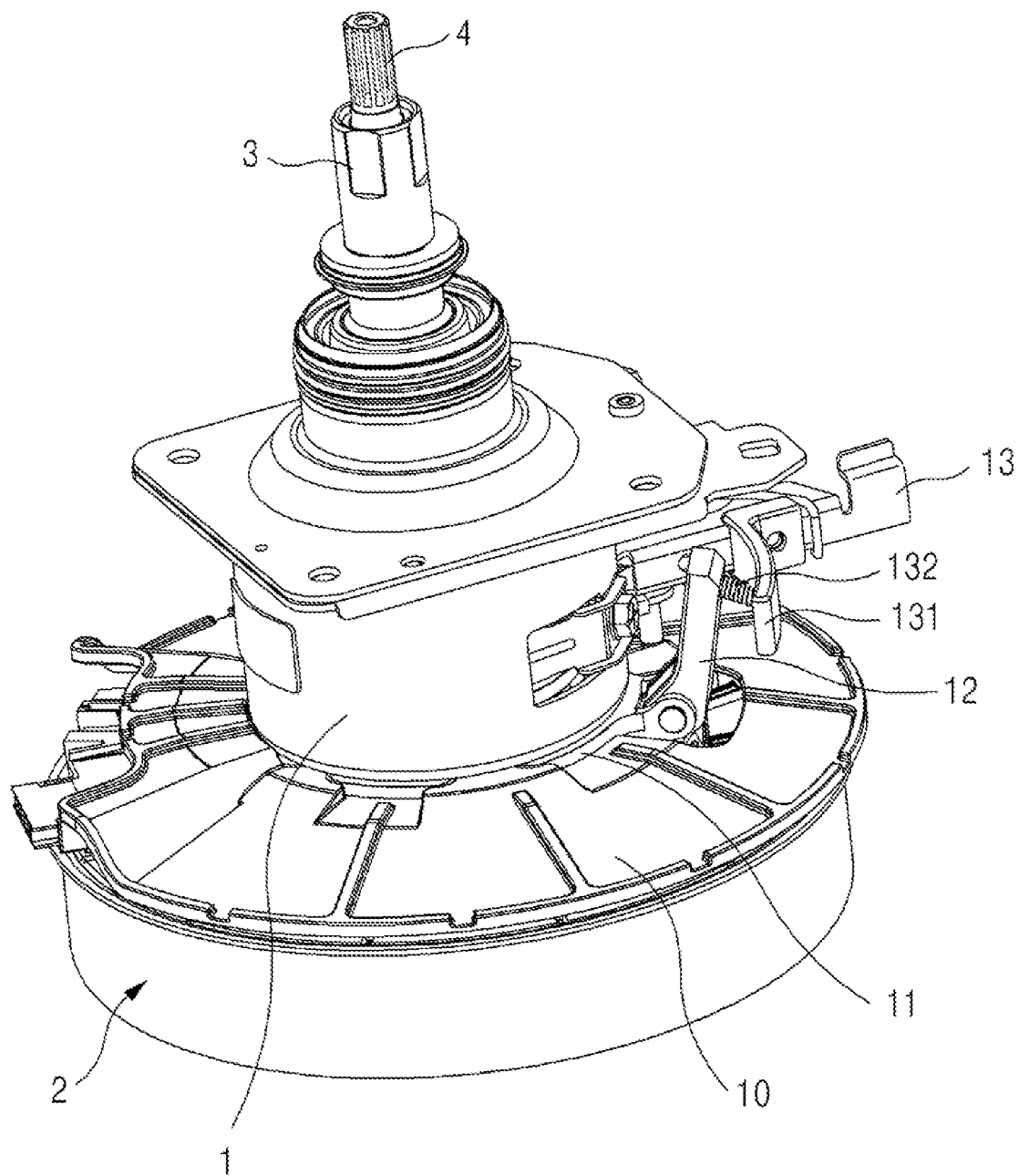

[Fig. 2]
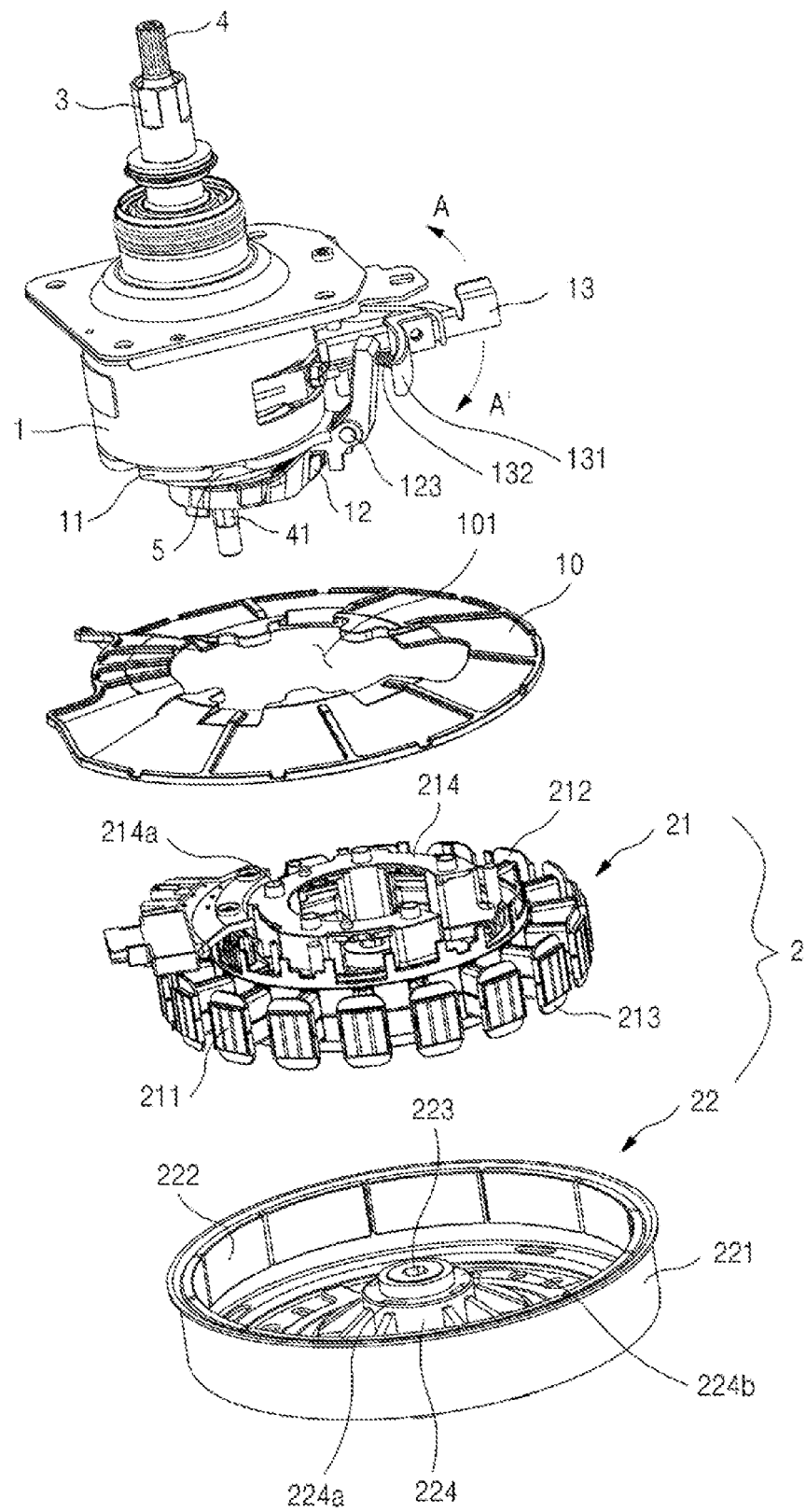

[Fig. 3]
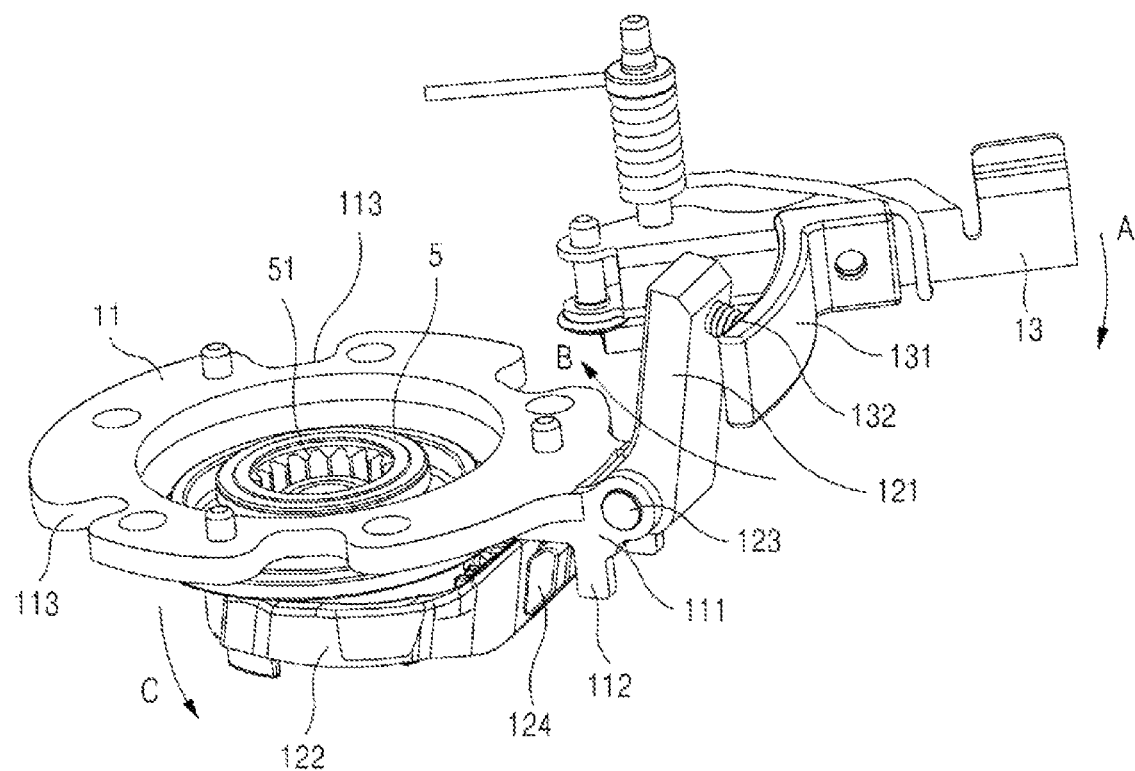

[Fig. 4]
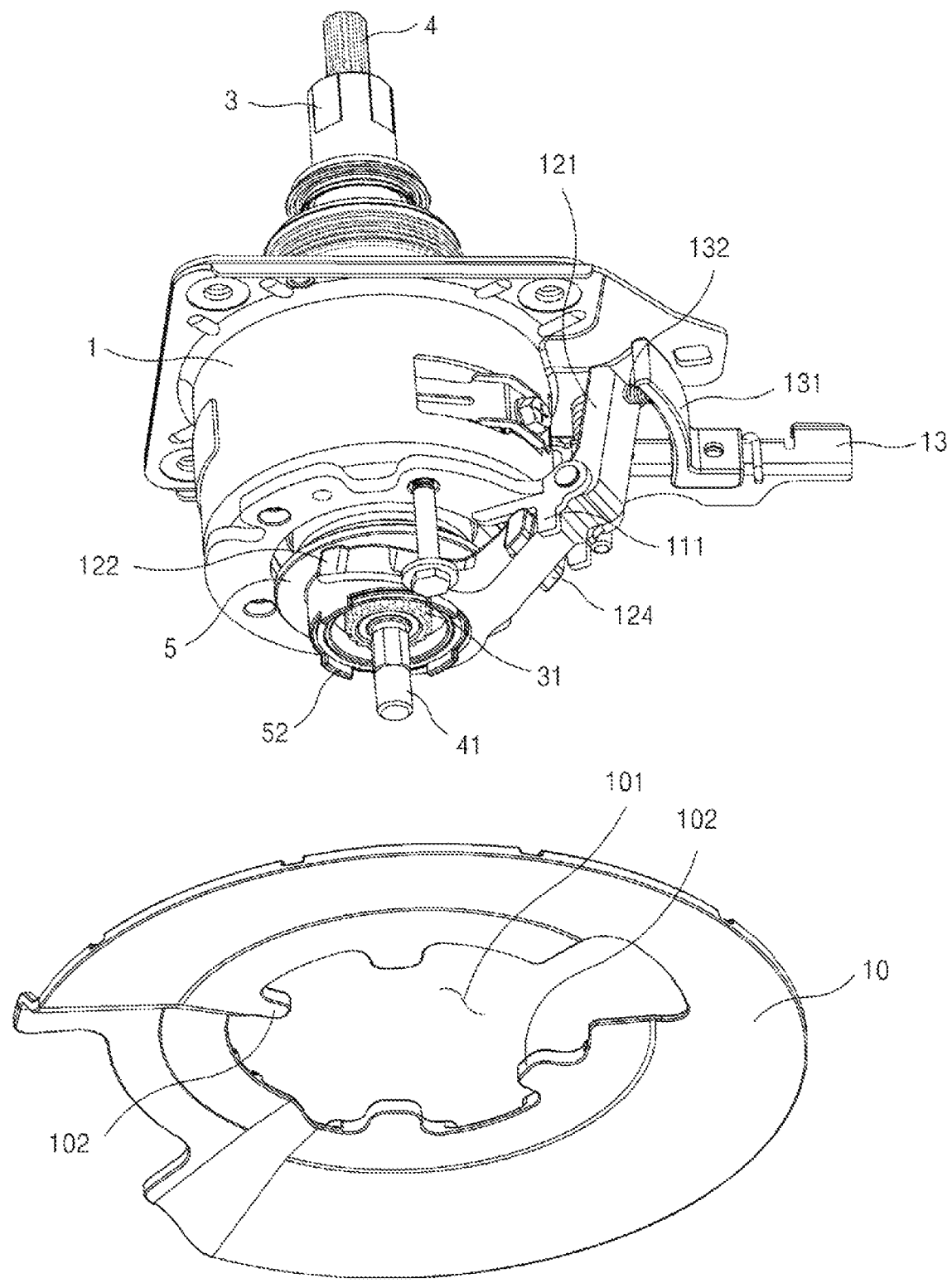

[Fig. 5]
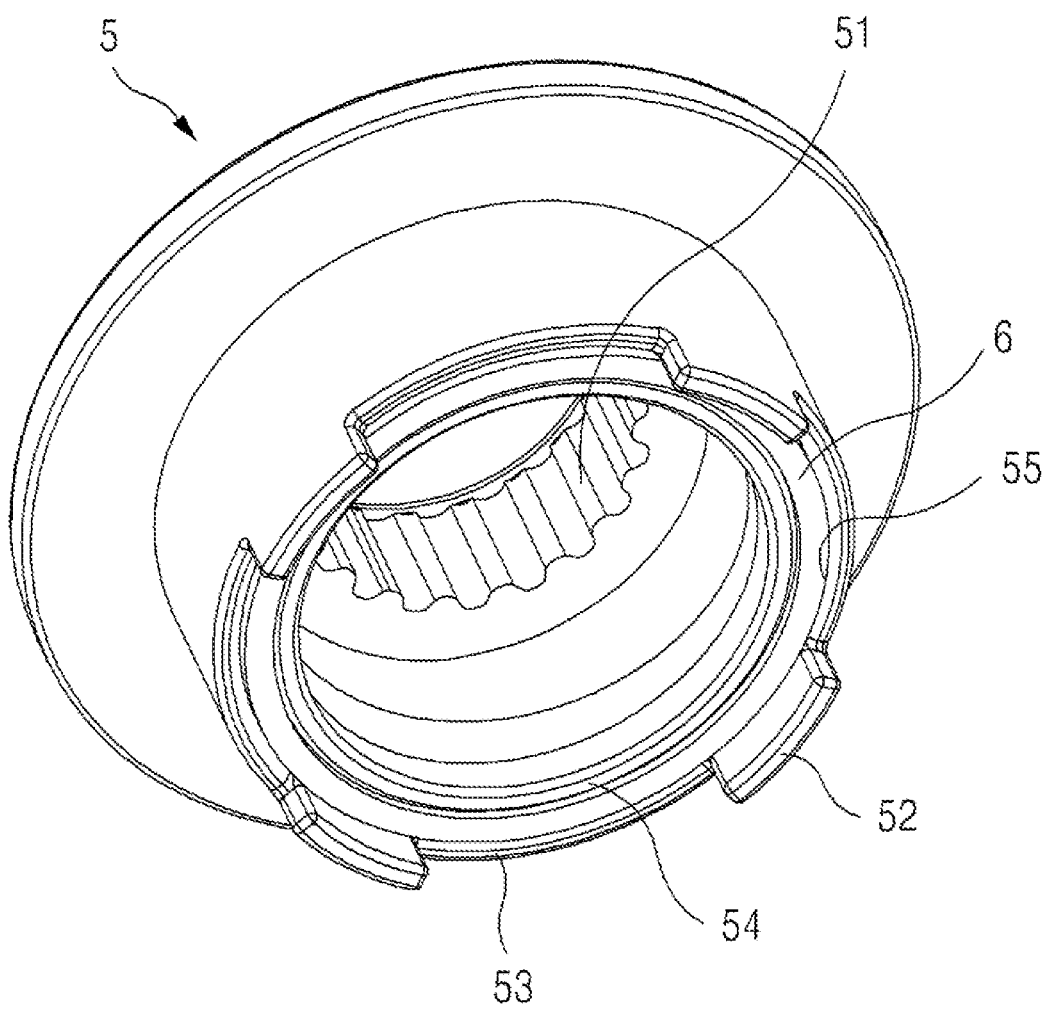

DRIVING APPARATUS FOR WASHING MACHINE

CROSS REFERENCE TO PRIOR APPLICATIONS

This application claims priority under 35 U.S.C § 119(a) to Korean Patent Application No. 10-2015-0140306 filed on Oct. 6, 2015, the entire content of which is incorporated herein by reference.

TECHNICAL FIELD

The present invention relates to a driving apparatus for a washing machine. More specifically, the present invention relates to a driving apparatus for a washing machine having a structure with more efficient clutch lever operation.

BACKGROUND ART

In general, washing machines are home appliances which remove contaminants from clothes or beddings by using the emulsification of detergents, and friction and impact of water flow resulting from the rotation of a washing wing. General washing machines perform the actions of washing and dewatering following the cycles of washing, rinsing and dewatering.

The washing machines are divided into pulsator-type washing machines and drum-type washing machines depending on the manner of washing. The pulsator-type washing machines perform washing and rinsing by rotating only the washing wing, i.e., the pulsator to form the flow of water in a state where the washing tank stops at the time performing the cycles of washing and rinsing. During the dewatering cycle, the pulsator-type washing machines rotate the washing wing and the washing tank together to perform dewatering by separating water from the laundry put into the washing tank by a centrifugal force.

To this end, in general, pulsator-type washing machines include a washing shaft which rotates the washing wing, a dewatering shaft which rotates the washing tank, and a clutch unit which selectively delivers a driving force of the motor to the washing shaft and the dewatering shaft according to the cycles of washing or dewatering.

According to Korean Patent No. 10-1524919, when a brake lever operates in order to selectively deliver the driving force of the motor to the washing shaft and dewatering shaft, a clutch lever rotates, and the clutch lever operates the clutch coupling to move up and down, thereby delivering or stopping the rotation of the motor to the dewatering shaft. In this case, a pressurizing lever installed on the brake lever directly contacts a top end of the clutch lever to operate, thereby allowing the brake lever and clutch lever to rotate. According to this structure, there may be cases where it is difficult to exactly match the rotation track of the brake lever and the rotation track of the clutch lever and operate them. Furthermore, since the two levers rotate and operate being in direct contact with each other, abrasion resulting from the friction may occur.

Additionally, Korean Patent No. 10-1524919 limits the operations of the clutch lever and coupling lever by a first stopper and a second stopper. This limitation to the operation range of the clutch coupling by the cooperation of the first and second stoppers formed in the two levers is slightly instable in terms of the operation of the two levers and linking to the clutch coupling. Furthermore, water may fall into the top of the motor from the washing tank, and this water may directly penetrate into the inside from the top of the motor, thereby causing breakdown of the motor.

Accordingly, in order to solve the above-mentioned problems, the present inventors suggest a driving apparatus for a washing machine which has a lever rotation with a new structure and is capable of efficiently preventing water falling from the top of the motor from penetrating into the motor.

SUMMARY OF INVENTION

It is an object of the present invention to provide a driving apparatus for a washing machine with a new rotation structure of two levers for efficient operation of the clutch of the washing machine.

It is another object of the present invention to provide a driving apparatus for a washing machine with a structure capable of preventing water falling from the washing tank from directly penetrating into the motor.

The objects above and other objects inferred therein may be easily carried out by the present invention explained below.

The driving apparatus for a washing machine according to the present invention includes a clutch housing including a washing shaft and a dewatering shaft which penetrate into the inside; an annular clutch holder installed at the bottom of the clutch housing; a clutch lever hinge-coupled to the clutch holder, the clutch lever consisting of a top rotating unit and a coupler receiving unit; a driving lever having a lever arm connected to the top rotating unit of the clutch lever by a linking spring to operate; a clutch coupler laid on the top of the coupler receiving unit to make up and down spline movement by the coupler receiving unit; and a motor assembly which includes a stator assembly coupled to the bottom of the clutch holder and including a stator core, and a rotor assembly including a rotor housing.

The clutch coupler may include an inner spline formed in the inside of the top of the clutch coupler; an outer wall formed to be extruded to the bottom of the clutch coupler and an inner wall formed by making a space with the outer wall on the inside of the outer wall; and at least two coupling teeth formed to be extruded to the bottom from the outer wall or inner wall.

The present invention may further include a damper inserted into the space formed by the outer wall and the inner wall.

According to the present invention, it is preferable that the coupling teeth is inserted into a coupling teeth hole of a center protrusion unit formed in the center of the rotor housing when the clutch coupler moves to the bottom.

The present invention may further include a waterproof cover covering the top of the motor assembly. Additionally, the waterproof cover may include a hollow unit formed in the inside, and at least one coupling protrusion formed to be protruded to the inside of the hollow unit. Also, at least one waterproof cover coupling groove may be formed in the clutch holder so that the waterproof cover is coupled to the bottom of the clutch housing by having the coupling protrusion coupled to the waterproof cover coupling groove.

The present invention exhibits effects of providing a driving apparatus for a washing machine capable of operating the clutch more efficiently through a new rotation structure of two levers operating the clutch of the washing machine, and preventing water falling from the washing tank from directly penetrating into the motor.

BRIEF DESCRIPTION OF THE DRAWINGS

FIG. 1 is a perspective view illustrating a driving apparatus for a washing machine according to the present invention;

FIG. 2 is an exploded perspective view illustrating a driving apparatus for a washing machine according to the present invention;

FIG. 3 is a perspective view illustrating a coupling structure of a driving lever, a clutch lever and a clutch coupler of the driving apparatus for a washing machine according to the present invention;

FIG. 4 is a perspective view illustrating the driving apparatus for a washing machine according to the present invention removed with a motor assembly, as seen from below; and FIG. 5 is a perspective view illustrating the clutch coupler of the driving apparatus for a washing machine according to the present invention, as seen from below.

Hereinafter, the present invention will be explained in detail with reference to the drawings attached herewith.

DETAILED DESCRIPTION FOR CARRYING OUT THE INVENTION

FIG. 1 is a perspective view illustrating a driving apparatus for a washing machine according to the present invention, and FIG. 2 is an exploded perspective view illustrating a driving apparatus for a washing machine according to the present invention.

As illustrated in FIGS. 1 and 2, the driving apparatus for a washing machine according to the present invention includes a clutch housing 1, a motor assembly 2, a dewatering shaft 3 and a washing shaft 4.

The dewatering shaft 3 and the washing shaft 4 penetrate into the center of the clutch housing 1. A gear set (not illustrated) allowing the washing tank to rotate by giving a big torque to the dewatering shaft 3 may be included inside the clutch housing 1. Additionally, a brake drum (not illustrated) may be installed in the inside of clutch housing 1 according to the type and necessity of driving apparatus. In this case, a driving lever 13 installed on one side of the clutch housing 1 operates the brake drum. The inner structure of the clutch housing 1 may be properly adopted and applied by a skilled person in the art as needed.

A waterproof cover 10 is coupled to a clutch holder 11 at the bottom of the clutch housing 1. The waterproof cover 10 is directly coupled to the clutch holder 11, thereby being coupled to the bottom of the clutch housing. A detailed structure thereof will be explained again in the following.

The clutch holder 11 is coupled to the bottom of the clutch housing 1 and has an annular ring shape. A clutch lever 12 is hinge-coupled to the clutch holder 11 to rotate. A driving lever 13 is installed on the top of the clutch lever 12 and has a lever arm 131. The lever arm 131 and the top of the clutch lever 12 are connected to each other by a linking spring 132 to operate. In FIG. 2, when the driving lever 13 operates in the direction of A, the top of the clutch lever 12 rotates with respect to a hinge point while rotating towards the center, that is, in the direction of the washing shaft 4. In this case, a clutch coupler 5 laid on the bottom of the clutch lever 12 moves to the bottom. Since a spring (not illustrated) is installed on the top of the clutch coupler 5, a force allowing the clutch coupler 5 to move to the bottom is always applied. Accordingly, when the driving lever 13 operates in the direction of A', the clutch lever 12 rotates to the opposite side thereof, and thereby the clutch coupler 5 moves to the top.

As illustrated in FIG. 2, the motor assembly 2 of the present invention includes a stator assembly 21 and a rotor assembly 22. The stator assembly includes a stator core 211, a top insulator 212 and a bottom insulator 213 each of which is coupled to the top and bottom of the stator core 211. The center of the top insulator 212 may include a clutch mounting unit 214 formed to be protruded to the top. A plurality of bolts (not illustrated) penetrating into the clutch mounting unit 214 are coupled to each hole (not illustrated) formed in the clutch holder 11 and the bottom of the clutch housing 1, and thereby the motor assembly 2 is coupled to the bottom of the clutch housing 1. In order to assist the coupling of the clutch housing 1 to the motor assembly 2 or align the coupling location, a plurality of alignment protrusions 214a are formed in the mounting unit 214. Additionally, an alignment hole (not illustrated) may be formed at the bottom of the clutch housing corresponding to the alignment protrusion 214a, thereby inserting the alignment protrusion 214a into the alignment hole.

The rotor assembly 22 includes a cup-shaped rotor housing 221, a plurality of magnets 222 attached to an inner wall of the rotor housing 221, a shaft coupling hole 223 formed in the center of the rotor housing 221 to be coupled to a rotating shaft 41, and a center protrusion unit 224 formed around the shaft coupling hole 223 to be protruded from the bottom surface of the rotor housing 221 to the top. At least two coupling teeth holes 224a are formed symmetrical to each other in the center protrusion unit 224. A flat unit 224b exists around the coupling teeth hole 224a.

At least two coupling teeth 52 formed on the bottom of the clutch coupler 5 are inserted into the coupling teeth hole 224a, and the number of coupling teeth 52 is identical to that of the coupling teeth hole 224a. The operation with the clutch coupler 5 by the coupling teeth 52 and coupling teeth hole 224a will be explained in detail with reference to FIGS. 3 and 4 below.

FIG. 3 is a perspective view illustrating a coupling structure of a driving lever, a clutch lever and a clutch coupler of the driving apparatus for a washing machine according to the present invention, and FIG. 4 is a perspective view illustrating the driving apparatus for a washing machine according to the present invention removed with a motor assembly, as seen from below.

Referring to FIGS. 3 and 4, the clutch holder 11 is a ring-shaped member coupled to the bottom of the clutch housing 1. One side of the clutch holder 11 has a hinge coupling unit 111. A hinge protrusion 123 of the clutch lever 12 is coupled to the hinge coupling unit 111 so that the clutch lever 12 may rotate with respect to the hinge protrusion 123. The bottom of the hinge coupling unit 111 includes a clutch stopper 112 formed to be protruded to the bottom. The clutch stopper 112 performs a hinge movement of the clutch lever 12, that is, plays a role of limiting the rotation range. The hinge protrusion 123 formed in the clutch lever 12 is stuck in the clutch stopper 112, thereby limiting the rotation range of the clutch lever 12. As illustrated in FIG. 3, the clutch stopper 112 may be formed at the bottom of the hinge coupling unit 111, or may be formed to be protruded to the bottom of the clutch holder 11. As another example, the clutch stopper 112 may be formed to be protruded to the top of the hinge coupling unit 111 and the stopper protrusion 124 may be formed at the bottom of the top rotating unit 121 of the clutch lever 12. In this case, the clutch stopper 112 may be formed on the clutch holder 11, not on the hinge coupling unit 111.

At least one waterproof cover coupling hole 113 may be formed on the outer circumferential or inner circumferential side of the clutch holder 11. At least one coupling protrusion 102 formed to be protruded towards the center along the inner circumferential side of the hollow unit 101 of the waterproof cover 10 is coupled in the waterproof cover coupling hole 113. The size and shape of the waterproof cover coupling hole 113 are formed to correspond to those of the coupling protrusion 102, and thereby they may be coupled to each other in a press fit form. Accordingly, the waterproof cover 10 may be coupled to the bottom of the clutch housing 1. The waterproof cover 10 may be configured to be coupled to the top of the stator assembly 21 of the motor assembly 2. In this case, however, since a waterproof cover should be applied when manufacturing the motor assembly 2, this would increase the manufacturing process of the motor assembly. Additionally, when the waterproof cover 10 is applied optionally, that is, when the waterproof cover 10 is not applied, the waterproof cover installed should be removed from the motor assembly 2, which would be a hindrance to versatility of the motor. Thus, it is advantageous to couple the waterproof cover 10 directly to the clutch housing 1 in terms of manufacturing process or versatility of motor.

The clutch lever 12 has a top rotating unit 121, and a coupler receiving unit 122 with a shape that may lift the clutch coupler 5 to the top from the bottom of the top rotating unit 121. As illustrated in FIG. 3, the coupler receiving unit 122 may have a 'C'-shaped type, but is not limited thereto. Various structures capable of making up and down spline movement of the clutch coupler 5 may be applied.

A hinge protrusion 124 is formed between the top rotating unit 121, which is a top portion of the clutch lever 12, and the coupler receiving unit 122. Additionally, a stopper protrusion 124 may be formed on the top or bottom of the hinge protrusion 123. The clutch lever 12 may make rotation movement with respect to the hinge protrusion 123. The top rotating unit 121 of the clutch lever 12 does not directly contact the lever arm 131 of the driving lever 13, but is connected thereto by the linking spring 132 to operate. As illustrated in FIG. 3, the lever arm 131 is located on the outer side of the top rotating unit 121. According to the present invention, the stopper protrusion 124 is formed at the top or bottom of the hinge protrusion 123. Additionally, the stopper protrusion 124 moves together with the rotation of the clutch lever 12 and is stuck in the clutch stopper 112 formed in the clutch holder 11, thereby limiting the rotation distance thereof. This structure allows the rotation range of the clutch lever 12 and driving lever 13 to be limited by a more stable and simple structure. In the drawings attached, the clutch stopper 112 and the stopper protrusion 124 are formed each in pairs, but they do not necessarily have to be formed in pairs, and the clutch stopper 112 and stopper protrusion 124 may be formed only at one side according to the necessity of design.

The driving lever 13 is driven in the direction of A illustrated in FIG. 3 or an opposite direction thereof. No additional apparatus for driving is illustrated, and an apparatus for operating the driving lever 13 may be properly selected and applied by a skilled person in the art according to specifications, etc. of the washing machine. FIG. 3 illustrates a state before the driving lever 13 operates in the direction of A. When the driving lever 13 operates in the direction of A, the lever arm 131 operates in the direction of B, thereby moving the top rotating unit 121 of the clutch lever 12 to the center direction (direction of washing shaft 4). Since the clutch lever 12 rotates with respect to the hinge protrusion 123, when the top rotating unit 121 drives towards the center, the coupler receiving unit 122 rotates in the direction of C. The rotation of the coupler receiving unit 122 moves the clutch coupler 5 laid thereon. In other words, when the coupler receiving unit 122 rotates in the direction of C, the clutch coupler 5 moves to the bottom.

When the clutch coupler 5 moves to the bottom, the coupling teeth 52 formed at the bottom of the clutch coupler 5 is inserted into the coupling teeth hole 224a formed in the center of the rotor housing 221. Accordingly, when the rotor housing 221 and the rotating shaft 41 rotate together, they rotate together with the clutch coupler 5. In this case, since the inner spline 51 of the clutch coupler 5 is still fitted together with the dewatering shaft spline 31 at the bottom of the washing shaft, the dewatering shaft 4 rotates together due to the rotation of the clutch coupler 5.

Thus, the rotation of rotating shaft 41 operates in a dewatering mode which rotates the dewatering shaft 3 and the washing shaft 4 together.

For washing mode (or rinsing mode) where only the washing shaft 4 rotates and the dewatering shaft 3 does not rotate, the driving lever 13 should operate as illustrated in FIG. 3. When the driving lever 13 operates in a direction opposite to direction A in the dewatering mode, the lever arm 131 moves in the direction opposite to direction B, that is, moves towards the outside direction, and the top rotating unit 121 of the clutch lever 12 rotates in the same direction. Accordingly, the coupler receiving unit 122 rotates in the direction opposite to direction C, and the clutch coupler 5 rises. Since a spring (not illustrated) is installed on the top of the clutch coupler 5, a force allowing the clutch coupler 5 to move to the bottom is always applied by the spring. When the clutch coupler 5 moves to the top, the coupling teeth 52 formed at the bottom of the clutch coupler 5 is separated from the coupling teeth hole 224a formed in the center of the rotor housing 221. Thus, since the rotation of the rotor housing 221 cannot make the clutch coupler 5 rotate together, the rotation of the rotor housing 221 and the rotating shaft 41 cannot make the dewatering shaft 3 rotate, but can simply make the washing shaft 4 rotate.

The waterproof cover 10 of the present invention has a hollow unit 101 in the center, and has a shape with a low inclination as going towards the outside from the hollow unit 101. Thus, water falling to the top of the waterproof cover 10 is allowed to flow towards the outside of the motor assembly 2, so that drainage can be made well. The material of the waterproof cover 10 is not particularly limited, but water resistant or moisture proof resin material may be used. Additionally, it is advisable for the material of the waterproof cover to be slightly flexible so that coupling and separation may be easily made.

FIG. 5 is a perspective view illustrating the clutch coupler of the driving apparatus for a washing machine according to the present invention, as seen from below.

As illustrated in FIG. 5, an inner spline 51 is formed in the inside of the top of the clutch coupler 5. The inner spline 51 is fitted with the dewatering shaft spline 31. Accordingly, when the clutch coupler 5 rotates to rotate the inner spline 51, that is, during the dewatering mode, the dewatering shaft spline 31 rotates to rotate the dewatering shaft 3.

At the bottom of the clutch coupler 5, an outer wall 53 protruded to the bottom, an inner wall 54 formed inside the outer wall 53, and a damper inserting groove 55 which is a space between the outer wall 53 and the inner wall 54 are formed. The coupling teeth 52 is formed to be protruded to the bottom from the outer wall 53, and it may also be formed in the inner wall 54, instead of the outer wall 53. In the damper inserting groove 55, a damper 6 with a material having elasticity such as rubber is inserted. It is preferable that the damper 6 is more protruded to the bottom than the inner wall 54. This is because the damper 6 plays a role of absorbing impact and preventing noise when the clutch coupler 5 moves to the bottom and touches the center protrusion unit 224 in the center of the rotor housing 221.

The detailed description of the present invention explained as above simply explains one or more examples for understanding the present invention, but does not intend to limit the scope of the present invention. The scope of the present invention is determined by the claims attached. Additionally, it should be construed that a simple modification or change falls under the protection scope of the present invention.

What is claimed is:

1. A driving apparatus for a washing machine, comprising:
    a clutch housing comprising a washing shaft and a dewatering shaft which penetrate into an interior of the clutch housing;
    a clutch holder installed at a bottom of the clutch housing;
    a hinge coupling unit formed at a side of the clutch holder;
    a clutch lever coupled to the hinge coupling unit by a hinge protrusion, the clutch lever consisting of a top rotating unit and a coupler receiving unit;
    a clutch stopper extended from a bottom of the hinge coupling unit;
    a stopper protrusion extended from a side of the coupler receiving unit and configured to be stuck in the clutch stopper when the clutch lever rotates with respect to the hinge protrusion;
    a driving lever having a lever arm connected to the top rotating unit of the clutch lever by a linking spring to operate;
    a clutch coupler laid on the top of the coupler receiving unit to make up and down spline movement by the coupler receiving unit;
    a motor assembly comprising a stator assembly coupled to a bottom of the clutch holder and comprising a stator core, and a rotor assembly comprising a rotor housing;
    a center protrusion unit formed in a center of the rotor housing; and
    coupling teeth holes formed in the center protrusion unit,
    wherein the clutch coupler comprises:
    an inner spline formed in an inside of a top of the clutch coupler;
    an outer wall extended from a bottom of the clutch coupler toward the center protrusion unit;
    an inner wall formed by making a space with the outer wall on an inside of the outer wall;
    a damper inserted into the space formed by the outer wall and the inner wall; and
    at least two coupling teeth extended from a bottom of the outer wall toward the coupling teeth holes,
    wherein the damper is more protruded to the center protrusion unit than the inner wall so that when the clutch coupler moves down toward the rotor housing and contacts the center protrusion unit, the damper absorbs impact and prevents noise and the coupling teeth are inserted into the coupling teeth holes.

2. The driving apparatus for a washing machine of claim 1, further comprising:
    at least one waterproof cover coupling groove formed on the outer circumferential side of the clutch holder;
    a waterproof cover directly coupled to the clutch holder at the bottom of the clutch housing and covering the top of the motor assembly,
    wherein the waterproof cover comprises:
    a hollow unit formed in the inside; and
    at least one coupling protrusion formed to be protruded to an inside of the hollow unit and coupled to the waterproof cover coupling groove.

* * * * *